United States Patent [19]
Andries

[11] 3,790,712
[45] Feb. 5, 1974

[54] ELECTRONIC STETHOSCOPE SYSTEM
[75] Inventor: Francis M. Andries, Tomball, Tex.
[73] Assignee: Computer Medical Science Corporation, Tomball, Tex.
[22] Filed: Feb. 24, 1972
[21] Appl. No.: 229,088

[52] U.S. Cl............................................. 179/1 ST
[51] Int. Cl. ......................... H04r 1/46, A61b 7/04
[58] Field of Search..... 179/1 ST, 179, 107; 181/24; 128/2.05 S

[56] References Cited
UNITED STATES PATENTS
3,160,708  12/1964  Andries et al..................... 179/1 ST
2,755,336  7/1956   Zener et al........................ 179/1 ST Primary Examiner—William C. Cooper
Assistant Examiner—Douglas W. Olms
Attorney, Agent, or Firm—Donald H. Fidler et al.

[57] ABSTRACT

A method and apparatus for the detection of heart sounds and fidelity reproduction for diagnostic purposes including a pick-up or sensing device which has an annular projection forming a pick-up head with a cone-shaped interior and also has a dynamic microphone. The pick-up head has a lip configuration such that a frequency range of between 20 and 1000 cps can be detected with adequate intensity. A dynamic microphone operates a class "A" amplifier to provide amplification without signal distortion. Multiple distribution of detected sound is contemporaneously and simultaneously available to listeners, and at the same time the sound can be recorded on tape. Sound analysis with respect to frequency content and amplitude is made as well as comparison to predetermined heart malfunctions for clinical diagnosis.

5 Claims, 8 Drawing Figures

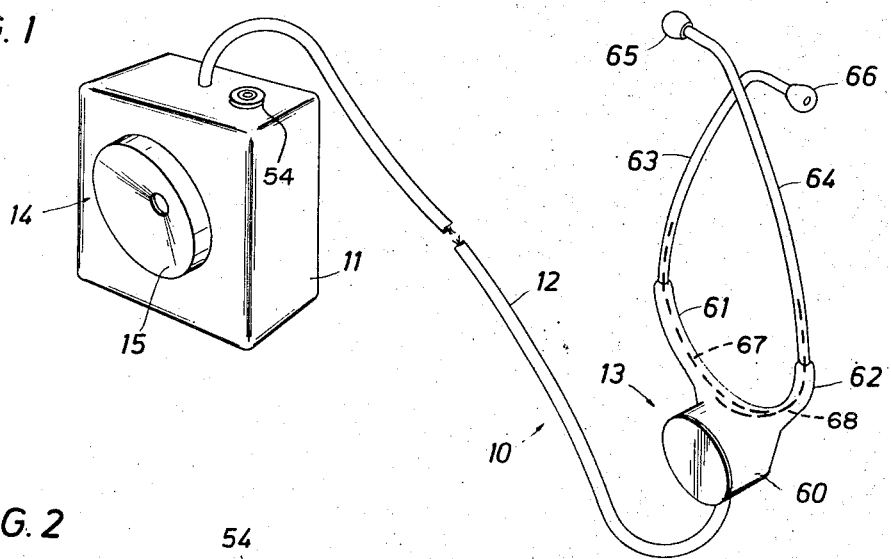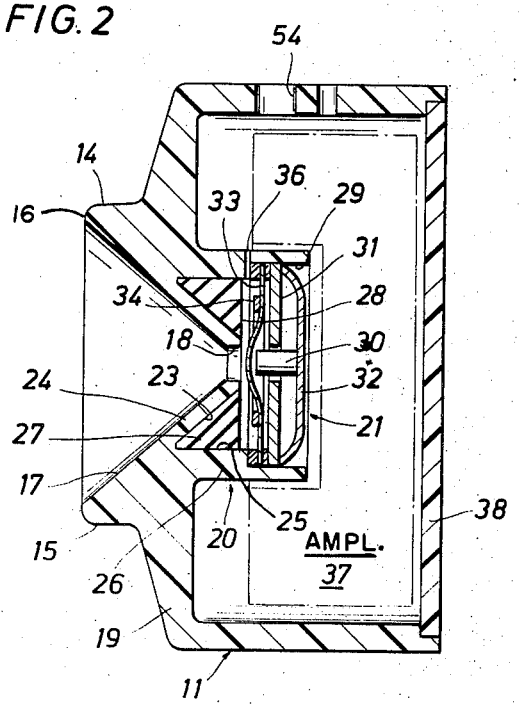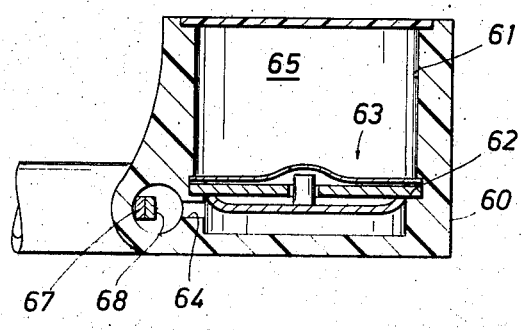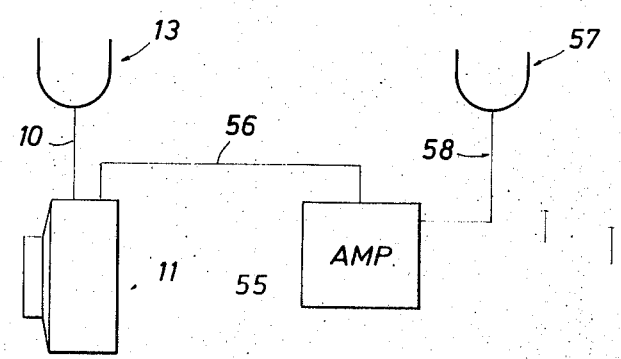

PATENTED FEB 5 1974 3,790,712

ELECTRONIC STETHOSCOPE SYSTEM

This invention relates to auscultation systems and, more particularly, to systems for obtaining fidelity transmission and analysis of heart sounds for diagnostic purposes.

Medical science is often dependent upon equipment or devices to obtain data or indications from the human body upon which a diagnosis or judgment can be made as to disease of the functioning of various systems of the body. Nothing is more essential to life than the functioning of the heart. In regard to the heart, the electrocardiogram is universally used to measure and record the timing function for the heart. For the condition and a specific analysis of the functioning of the elements of the heart, a stethoscope is used as the measuring instrument. The stethoscope is obviously only a device to convey sounds from within a torso to the ears of a listener. If it is assumed, in the abstract, that all stethoscopes are identical in reproducing the sound from a torso to the ears of the listener, this alone is sufficient to illustrate the difficulties of diagnosis. The difficulties quite obviously arise because the hearing mechanism for each individual is unique, and the response mechanism for an individual varies with time and the existing conditions. Despite the great limitations of the hearing system, it has a remarkable automatic gain control which can respond to both weak sounds and explosions. Coupled with the brain, which can store sound patterns for future recognition, the hearing mechanism is remarkably accurate in detecting distinctions in sound. Despite the remarkable ability of physicians to identify and evaluate organic heart disease from a physical examination, there is nonetheless inconsistency or disagreement between physicians in diagnosis of heart sounds as between patients and also as between the meaning of the sound. In teaching students the art of diagnosis from sound, it is also difficult to arrive at any common rationale by which each student can compare what he might hear relative to what the instructor can hear.

Considering the heart, briefly, it is basically a four-chambered muscular pump periodically triggered by an electrical pulse for the purpose of supplying oxygenated blood to the body. A sequence of functions must occur in a timed sequence to accomplish this function. The right atrium and right ventricle are in series relationship and function to pump blood returning from passage through the body to the lungs to pick up oxygen. From the lungs, the blood is passed through the left atrium and the left ventricle which are in series relationship. By contraction and expansion of the heart organ, various valves are sequentially operated and blood is pumped through the body.

During contraction, the mitral and tricuspid valves of the heart close by atrial contraction, and the closure of these valves is a principal source of sound. The intensity of the sound is dependent on the rapidity with which the valves close and the condition of the valves. Relative pressures also affect the intensity of the sound. For example, if the contraction is slow, the valves travel some distance before they abruptly shut, and this would cause a fainter sound than a fast contraction. On the other hand, a high pressure would tend to keep the valve open longer; consequently when a valve shuts, it has a resultant higher intensity sound. A second heart sound is generated by the closure of the aortic and pulmonary valves. Because the valves do not necessarily operate at the same time, the first as well as the second sounds may be split to reflect the separate valve closures.

Murmers generally are defined in relation to the heart sounds and are divided into two groups. Those occurring between the first and second heart sounds are known as systolic murmers, while those occurring between the second and first sounds are known as diastolic murmers. Murmers can be a flow of blood through a small aperture, a flow of blood caused by sudden expansion, an excessive rate of flow and a change in the viscosity of the blood. Murmers and heart sounds, as might well be expected, have definite frequency characteristics.

As mentioned before, the heart is triggered by an electrical timing pulse. These pulses can be recorded and displayed as an electrocardiogram. The stethoscope, on the other hand, is used to supply the "sounds" of the heart to the physician's ears. There are three main aspects of the sounds which are of interest: (1) the rhythm and rate of percussive sounds; (2) the presence, timing and tonal character of sustained sounds, and (3) the relative intensities of the major percussive and sustained sounds. These aspects are describable in terms of intensity, time of occurrence, quality and pitch. The system between the heart and the physician's ears includes the medium between the heart and the chest wall, the pick-up device, the transmission system between the pick-up device and the head set. Thus there are variable factors which can effect the sound actually detected by the ears.

Experience has established that certain areas of the thorax are better than others for hearing heart sounds. At the same time, the difference between the times of arrival for the same sound at different locations on the torso depends upon the place of origin for the sound, on the path which it takes to the surface, and on the velocity of sound in tissues. With this in mind, it can be appreciated that the location and type of the stethoscope can make a difference as to the correct isolation of the source of the sound. That is, a directional sensor will be more sensitive to the sound and its source than a contact type of sensor. In the conventional stethoscope pick-up, the vibrations produced in the human body are transmitted by air through changes in pressure in a closed chamber system. In an electronic stethoscope, the pick-up has a microphone which converts the vibrations to electrical impulses. These impulses are carried by conductors to a transducer in the head-set which reconstitutes the pressure pulses from the electrical pulses so that they can be received by the ear.

The frequency spectra of the heart sounds is rich in low frequency components with relatively strong intensity. On the other hand, the high frequency components have substantially lesser amplitudes. Generally, the frequency range has a band of 40 to 1,000 cps and contains the useful information for the ear. The ear can detect differences in frequencies (tone) but the sound must have sufficient duration, and there is a reaction time involved in the ear. Tone quality which is sometimes called timbre is that characteristic of a tone which is affected or dependent upon the harmonic structure of the tone. Masking effects occur in complex sounds as the lower pitched sounds tend to be more prominent.

In the system to be described hereafter, it is important to remember that the components complement one another. It is essential to balance the frequencies and to transfer heart sounds which are relatively short duration impulses to the human ear by way of an electronic and acoustical system so that the information presented to the ear has a direct relationship to that information which is generated by the heart sound. In another sense, it is equally important to obtain an analysis of the sound for features which are unintelligible to the ear. The ear, for example, only accepts 50 percent of the information and cannot detect phase in short time durations similar to the time of heart sounds.

In the present system, a bell-shaped pick-up head and dynamic microphone are used to detect the sound. By varying the pressure of the pick-up head on a torso, the frequency detection can be varied. With the pick-up head of the present invention, the lip configuration is such that the frequency can be detected between 20 and 1,000 cps with adequate intensity. The dynamic microphone has a diaphragm which is sensitive to velocity and is directional. A pressure bleed hole is provided in the pick-up device where the size of the hold has a short pressure time constant relative to the range of frequencies. The diaphragm operates an electronic amplifier with class "A" amplification to avoid distortion. High frequency components above 2,000 cps are filtered out and not more than 20 percent of the microphone capacity is utilized so that larger dynamic pulses can be handled.

While the detecting of the heart sound is under the control of a physician by means of the present invention, the ears of a number of students can be coupled into the system so that they can contemporaneously and simultaneously listen to the same sound response. Additionally at the same time, the heart sound can be recorded on tape. The recorded heart sound is analyzed with respect to frequency content and time for one set of records. The recorded heart sound is also compared with respect to reference tapes to determine if identification with respect to tapes having known malfunctions can be made.

The objects and purposes of the present invention will become more apparent from the following detailed description which should be taken in connection with the accompanying drawings in which:

FIG. 1 is a view of a pick-up device and headset combination;

FIG. 2 is a view in cross-section taken through a pick-up device;

FIG. 4 is a view of one form of the invention for use of multiple pick-up devices;

FIG. 5 is a view in cross-section through a headset;

Figure 3:
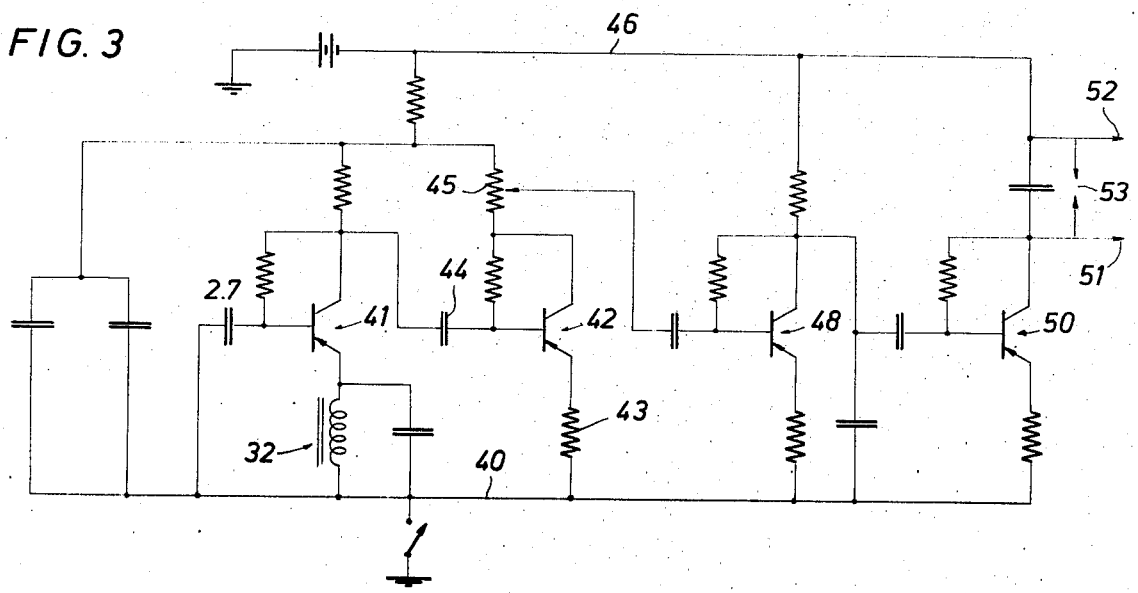
FIG. 3 is a schematic of an amplifier system for use in the present invention.

Referring now to FIG. 1, an electronic stethoscope 10 embodying the present invention is illustrated. The stethoscope 10 includes a sensing or pick-up device 11, an electrical cord 12 and a headset 13. The sensing device 11 has a cone-shaped pick-up head 14 for isolating an area from which sound is to be detected. As shown in FIGS. 1 and 2, the pick-up head 14 consists of an annular, projecting member 15 integrally formed on a rectangularly shaped housing. The housing is formed from a suitable plastic material. The projecting member 15 has a forward lip portion 16 for engagement with a skin surface, a conically shaped interior wall surface 17 and a centrally located sound opening 18. The forward wall 19 of the housing 16 has an inwardly extending annular, ring-shaped portion 20 in which a transducer 21 is mounted. The lip 16 is a circular edge formed between the conically shaped wall 17 and the curvilinear surface on the projecting member 15. The curvilinear surface should have a large radius so as to avoid a "sharp" edge as this type of edge will lose low frequency sounds.

In the annular ring-shaped portion 20 is a V-shaped groove formed by a cylindrical wall 25 and a conically formed wall surface 23. The annular ring-shaped portion 26 is disposed intermediate of the length of the conically formed surface 17. A realtively thin-walled section 24 is formed between the wall surfaces 17 and 23. Disposed in the V-shaped groove is a complementarily shaped plastic member 27 which has a flat surface 28 perpendicular to the ring-shaped portion 26. The flat surface 28 in alignment with the bottom of the opening 18.

A short distance above surface 28, the wall section 26 has an annular recess 29 which is sized to the diameter of the transducer 21. The transducer 21 is comprised of a cylindrically shaped magnet 30 having its upper end projecting through an opening in a disc-shaped pole piece 31. Pole piece 31 is connected at its outer edge to a U-shaped magnetic member. A thin plastic diaphragm 33 is connected at its outer edges to the pole piece 31, and the diaphragm has a small spherically shaped bulge at its center over the magnet 32. A coil of wire 34 is secured to the diaphragm 33 so that it is in the area of the air gap between the magnet 30 and the pole piece 31 and moves with the diaphragm which is free to flex in an axial direction. An annular disc of hard fibrous material is disposed between the diaphragm and the shoulder on the recess for mounting purposes.

Between the shoulder on which the transducer is mounted and the flat surface 28 is an opening 36 in the wall section 26. The opening 36 is sized to provide pressure relief in the internal chamber formed by the conically-shaped interior wall surface so that pressure cannot build up within the chamber when high amplitude, low frequency sounds are detected. The size of the opening is a function of the volume defined by the conically-shaped interior wall surface and should be such that there is a short pressure time constant relative to a 20 to 1,000 cps range of frequencies. Because of the large volume in the housing, the opening 36 need not be vented to the exterior of the housing where it could be accidentally closed by a finger. Within the housing, an electronic amplifier circuit is arranged on a board as designated by the dashed line enclosing the number 37. A rear plate member 38 is provided to enclose the interior of the housing 16.

The open pick-up head, when applied to a patient's chest, may be considered as having a diaphragm. The skin, which is bounded by the lip of the bell, forms the diaphragm, and the fleshy portion under the skin acts as a damping medium. The larger the diameter of the open pick-up head, the better its response to low pitched sounds. This is accomplished, however, at the expense of higher frequency components. The greater the pressure with which the open pick-up head is applied to the patient's chest, the better is the response to high frequency components. Thus, by varying the application pressure, the physician exerts a variable selective action upon the sound because the natural period of the skin diaphragm which is bounded by the open pick-up head depends upon the pressure with which it is applied.

As shown in FIG. 2, the detecting device is a dynamically operable transducer 21 which produces an electrical signal in the coil 34 in response to changes in air pressure within the volume defined by the conically-shape interior wall surface. Preferably the transducer 21 is sized to operate at about 20 percent of its capacity, so that relatively little distortion is introduced to the signal.

Referring now to FIG. 3, a schematic diagram of the amplifier is illustrated. The coil 32 is connected between the ground line 40 and the emitter of a PNP transistor 41. The collector of transistor 41 is further connected to the base of a second transistor 42 via a coupling capacitor 44. The emitter of transistor 42 is connected through a resistor 43 to the ground line 40 while the collector is connected through a potentiometer 45 to the supply line 46. Potentiometer 45 provides for gain or volume control. The potentiometer arm is coupled via a capacitor 47 to the base of a transistor 48. The output of transistor 48 is coupled via a capacitor 49 to the base of transistor 50. Transistor 50 has output lines 51 and 52 to the transducer in the headset. It is thus seen that four stages of amplification are provided. The amplification is class "A" so that the fidelity of the signals is maintained.

A jack output is provided at 53, so that multiple headsets can be coupled to the master stethoscope. As shown in FIG. 2, an access opening 54 is provided in the housing to permit access for an electrical jack which can couple the stethoscope into the output of an amplifier.

Use of multiple headsets is a unique facet of the present invention. A physician-teacher can use the stethoscope, and the same sound as heard by the physician can be simultaneously observed by other listeners. Referring now to FIG. 4, a distributional amplifier 55 is directly coupled through electrical conductor means 56 to the jack output 53 in a pick-up 11. Separate headsets 57 are individually coupled to the amplifier 55 and, by virtue of the amplifier, receive the sane sound detection as the headset 13.

The headset 13 includes a one-piece integral housing 60 (see FIG. 5) with tubular outlets 61 and 62 which respectively receive metal, hollow conducting tubes 63 and 64 (FIG. 1). The conducting tubes 63 and 64 have ear plugs 65 and 66 at their terminal ends. The housing 60 is constructed of plastic, and the tubular openings are arranged so that the conducting tubes are resiliently set in a contracted position. To assist in the spring function, flat spring members 67 and 68 with a preformed curvature are mounted in the housing. Upon being inserted into ears, the ear plugs 65 and 66 are retained in position with the pressure due to the resilient housing and the spring members 67 and 68. As illustrated in FIG. 5, housing 60 includes a cylindrical recess 61 in which a shoulder 62 provides a surface for mounting of a transducer 63. The transducer 63 is preferably matched in electrical characteristics to the transducer 21 in the pick-up 11. The transducer 63 is held in place by means of a snap ring received in an annular recess. The interiors of the tubular outlets are coupled to one another, and an opening 64 places the outlets in communication with the transducer. The housing 60 has a sufficient volume 65 of air space provided so as not to damp the response of the transducer 63.

As mentioned heretofore, the pick-up head of a stethoscope has a significant function to sensitize and focus the sound to the receiver. The housing, which is shown in cross-section in FIG. 2, is comprised of a suitable plastic material, and the is integrally cast into the housing. The pick-up head formed in the forward wall of the housing has a conically shaped interior recess which is formed at a suitable angle. The provision of the V-shaped groove permits casting of the housing without distortion or breakage.

When the skin of the torso is engaged by the edge of the pick-up head, the skin is compressed about the edge of the pick-up head and the tautness of the skin encompassed by the pick-up head is varied. In actuality, the physician will and can vary the degree of pressure to vary the frequency of the response. With the edge surface of the pick-up head having a defined sharp inner edge, this edge can sharply define a circumscribed area. As the pressure is increased, the skin area to the exterior of the edge is compressed and the skin area within the edge of the pick-up head is less affected.

As illustrated in FIG. 4, the output of the electronic amplifying circuit may be coupled to the input of a distribution box. The distribution box is provided with multiple jack arrangements which can respectively receive the input plug from a headset. Thus, it will be appreciated when the stethoscope as illustrated in FIG. 1 is applied to a patient, the sound reproduction transmitted to the ears of the physician is identically transmitted to the ears of each person coupled in parallel to the initial headset. Thus, for instructional purposes it is easily appreciated that the instructor can identify for students the particular phenomena which he observes, and they can relate it to their own sense of hearing at the instant of time at which the sound is being heard. It should thus be apparericated that the instantaneous and simultaneous hearing functions are markedly superior to any other existing type of system.

Figure 6:
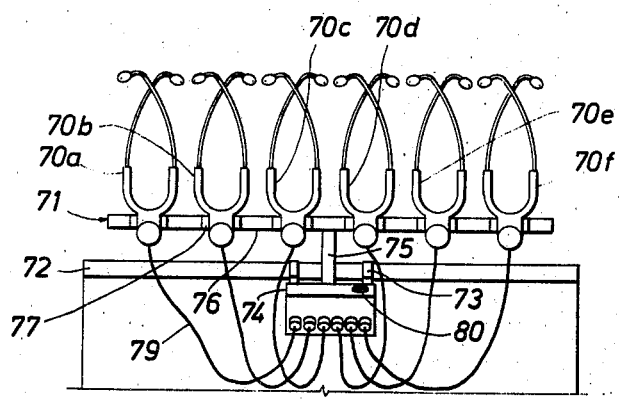
FIG. 6 is a view of an amplifier system for use with the present invention for auditorium use.

As illustrated in FIG. 6, a number of headsets 70 (a-f) can be mounted with respect to a rack 71 on the back of a chair 72. In this embodiment, C-type clamps 73 on an electrical distribution box 74 attach to the back of a chain 72 while an upstanding frame member 75 is connected to a horizontal frame member 76. The horizontal frame member 76 is rectangularly shaped and is provided with notched recesses 77 along its length. The various headsets are received by the matching recesses. The conducting wires 79 for the headsets are looped to connection with the distribution box 74. It will be readily appreciated that this structure provides a convenience for storage, easy set-up, and can be used in auditoriums. As shown schematically in FIG. 6, the electrical distribution box 74 has an input jack 80 which can be coupled to a stethoscope. Alternatively, th input from a tape recorder can be coupled into the box 74.

Figure 7:
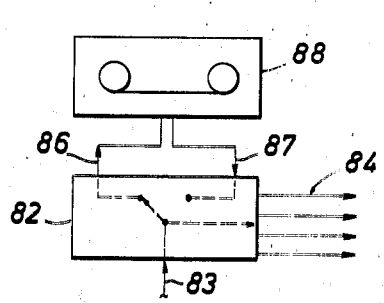
FIG. 7 is a view of a recording system for use with the present invention.

Referring now to FIG. 7, a distribution amplifier 82 is provided which receives the input 83 from a stethoscope. The input 83 is directed to a plurality of output jacks 84 as well as a switch 85 which can couple the input 83 and jacks 84 to either the input or output of a tape recorder 88. The tape recorder 88 thus can record the heart sounds as detected by a stethoscope or can play such heart sounds back after recording.

Figure 8:
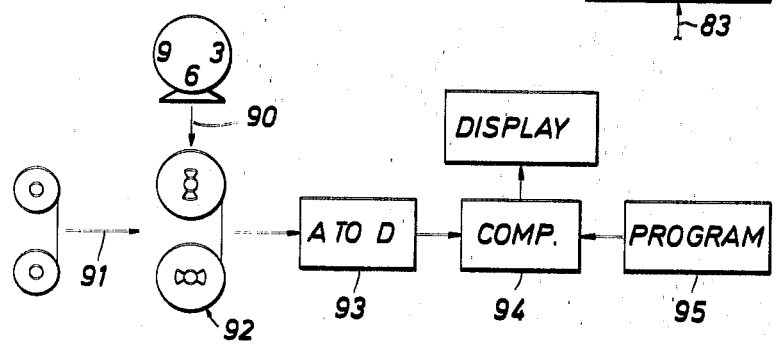
FIG. 8 is a flow diagram for computer processing of information of the present invention.

From taped heart sounds, the present invention makes diagnosis less susceptible to judgment by reducing the sounds to a condition where analytical analysis is possible. In this process, the first requirement is that the sounds be correlated with respect to time. As schematically illustrated in FIG. 8, the first step of the process is to correlate with the heart sound a timing function. In this step, a timing signal 90 is input on a separate trace with the heart sounds 91 on a separate trace to a magnetic tape 92. The tape 92 is input to an analog-to-digital converter 93 which digitizes the signals. The digitized signals are then supplied to a computer 94 which performs a Fourier analysis of the determination of the frequency content of the time dependent signal. The digitized signals are output as a power spectral analysis. The amplitude spectrum is derived as a function of the square root of the power spectrum.

In another aspect of the present invention, a program 95 is input into the computer simultaneously with the tape input 92. The program 95 consists of separately analyzed master heart sound formats using a power spectral analysis for heart ounds. The master formats are predetermined representations of heart sounds for various specified heart malfunctions. The recorded heart sound from tape 92 is separately compared with each of the master formats, and if the input from tape 92 correlates with any format, a suitable print-out indication is given. Thus, comparison of heart sounds is obtained on an equal basis, and diagnosis of a heart malfunction is clinically obtained independently of a physician.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. An electronic pick-up device comprising:

a hollow housing member constructed from a plastic material and including an exterior, cylindrically shaped pick-up portion and an interior, ring-shaped portion, said interior ring-shaped portion being disposed within said pick-up portion, said exterior and interior portions being in alignment along a common axis, said interior portion defining an interior cylindrically-shaped recess, said pick-up portion having an outer curvilinear surface and an inner, conically formed surface, which surfaces join to form a cylindrically formed outer edge, said conically formed surface extending from said outer edge to a central opening in said housing member, said conically formed surface defining an exterior recess, said central opening placing said exterior and interior recesses in communication with one another, said ring-shaped portion being connected to the interior of the housing members at a location intermediate of said conically formed surface so that an interior "V" shaped groove is formed between the inner wall of said conically formed surface and said ring-shaped portion, a complementarily "V" shaped plastic member sized to fit in said "V" shaped groove, said plastic member having a flat surface which is perpendicular to said ring-shaped portion when said plastic member is in said groove, said flat surface lying in the same plane as said central opening, a dynamically responsive transducer disposed in the interior recess of said ring-shaped portion and centered with respect to said central opening, and a pressure bleed passage extending at right angles through said ring-shaped portion, said bleed passage being located between said transducer and said flat surface and opening to the interior of said hollow housing member.

2. The apparatus of claim 1 wherein said passage is sized relative to the volume defined by said pick-up portion to provide a short pressure time constant relative to a 20 to 1,000 cps range of frequencies.

3. The apparatus of claim 2 and further including class "A" electrical amplifying means in said housing member and coupled to said transducer, said amplifying means having an electrical jack connector and an aligned opening in said housing whereby a jack connector may be selectively coupled to said amplifying means.

4. The apparatus of claim 3 and further including headset means, said headset means including an integrally formed base member having a recess, a headset transducer in said recess which is matched in response characteristics to the transducer in the housing member and electrically coupled to said amplifying means, and sound tubes having ear plugs for reception in a set of ears, said sound tubes being received in openings in said base member.

5. The apparatus of claim 4 wherein flat spring members are disposed in said base member and sound tubes for resiliently biasing said sound tubes toward one another.

* * * * *